United States Patent [19]

Sternberg et al.

[11] 4,332,018
[45] May 25, 1982

[54] WIDE BAND MOSAIC LENS ANTENNA ARRAY

[75] Inventors: Robert L. Sternberg, Noank, Conn.; Warren A. Anderson, Tiverton, R.I.

[73] Assignee: The United States of America as represented by the Secretary of the Navy, Washington, D.C.

[21] Appl. No.: 117,426

[22] Filed: Feb. 1, 1980

[51] Int. Cl.$^3$ .......................................... H04B 13/00
[52] U.S. Cl. .................................. 367/150; 367/155; 367/103; 367/905
[58] Field of Search .............. 367/103, 105, 122, 123, 367/138, 150, 153, 154, 155, 905; 343/100 SA, 854

[56] References Cited

U.S. PATENT DOCUMENTS

| | | | |
|---|---|---|---|
| 3,090,030 | 5/1963 | Schuck | 367/138 X |
| 3,364,461 | 1/1968 | Trott | 367/905 |
| 3,457,543 | 7/1969 | Akervold et al. | 367/155 |
| 3,601,789 | 8/1971 | Sullivan | 367/153 |
| 3,928,839 | 12/1975 | Warner et al. | 367/105 |
| 4,045,800 | 8/1977 | Tang et al. | 343/854 |
| 4,158,189 | 6/1979 | Wardle | 367/153 |
| 4,168,482 | 9/1979 | Sternberg | 367/150 |
| 4,186,398 | 1/1980 | Minnett | 343/100 SA |
| 4,218,768 | 8/1980 | Hasslu | 367/901 |

Primary Examiner—Harold J. Tudor
Attorney, Agent, or Firm—Robert F. Beers; Arthur A. McGill

[57] ABSTRACT

A wide band, substantially constant beamwidth, frequency independent, scannable acoustic array uses a mosaic pattern acoustic lens arrangement of fully directive acoustic lens antennas as the primary array antenna elements. The lenses at the center of the array pass signals at all frequencies, the lenses near but not at the center pass all signals except those at the highest frequencies and the lenses on the outer periphery pass only those signals at the lowest frequencies. When used as a transmitter, a wide band source supplies a broad band frequency signal to a plurality of filters, time delays, amplifiers, switches and acoustic retinas for applying predetermined signals to the acoustic lenses. When used as a receiver the same plurality of filters, time delays, amplifiers, switches and acoustic retinas act in a complimentary reciprocal fashion in the recovery of signals. The geometrical distribution of the various frequencies over the array described above produces a substantially constant effective aperture to wavelength ratio independent of frequency for the antenna as a whole which results in formation of a substantially constant beamwidth, frequency independent beam while the time delays, being dependent only on the lens spacing and the scan angle and not on the wavelength provide for scanning independent of frequency.

9 Claims, 18 Drawing Figures

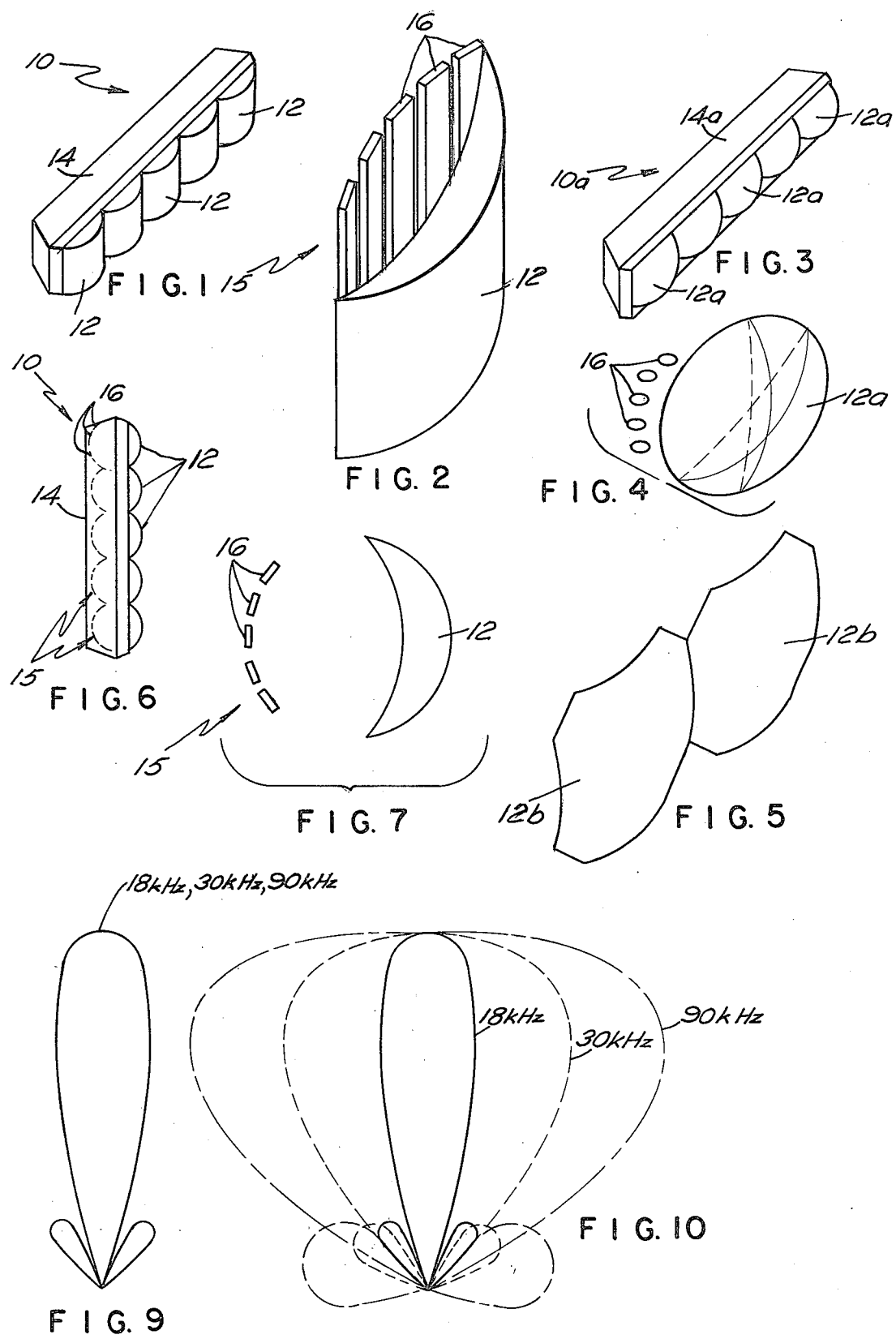

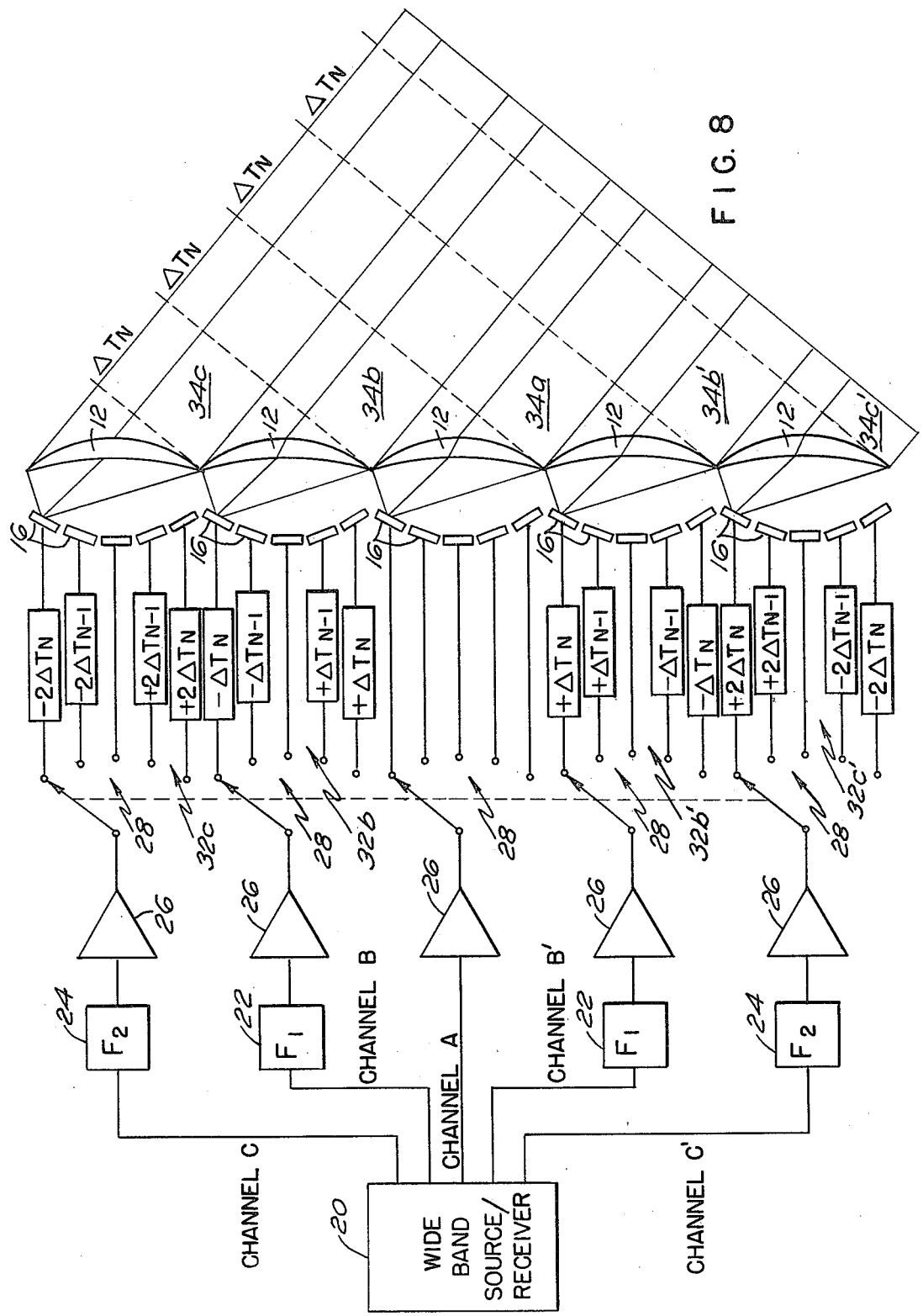

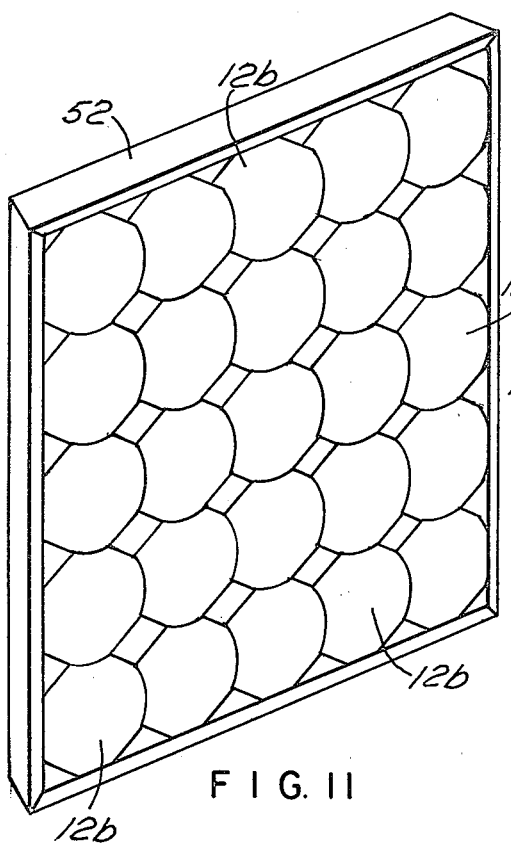
FIG. 11
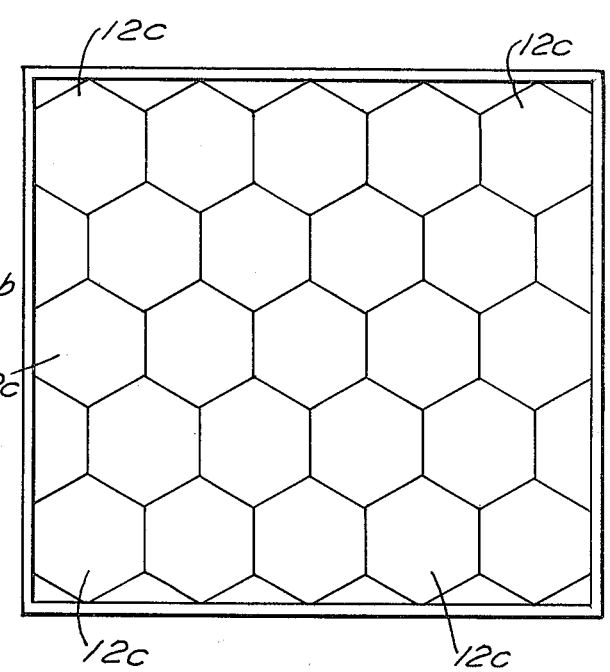
FIG. 12
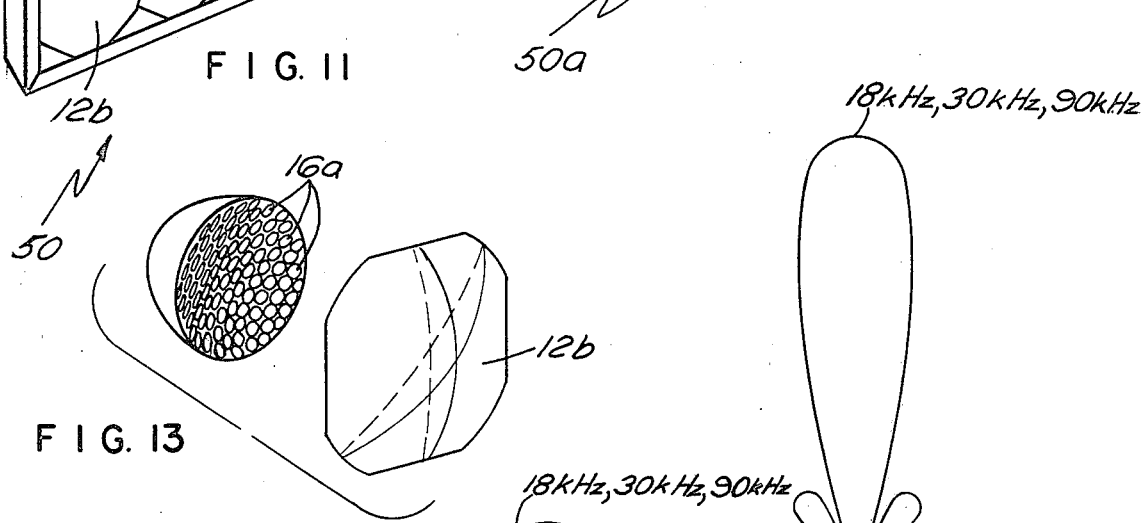
FIG. 13
FIG. 15
FIG. 16

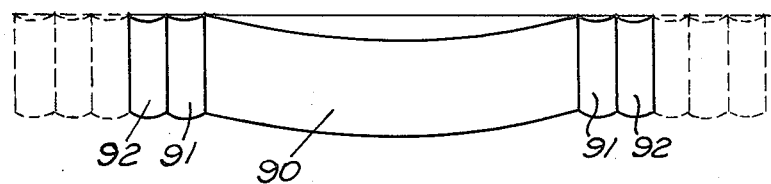
F I G. 17
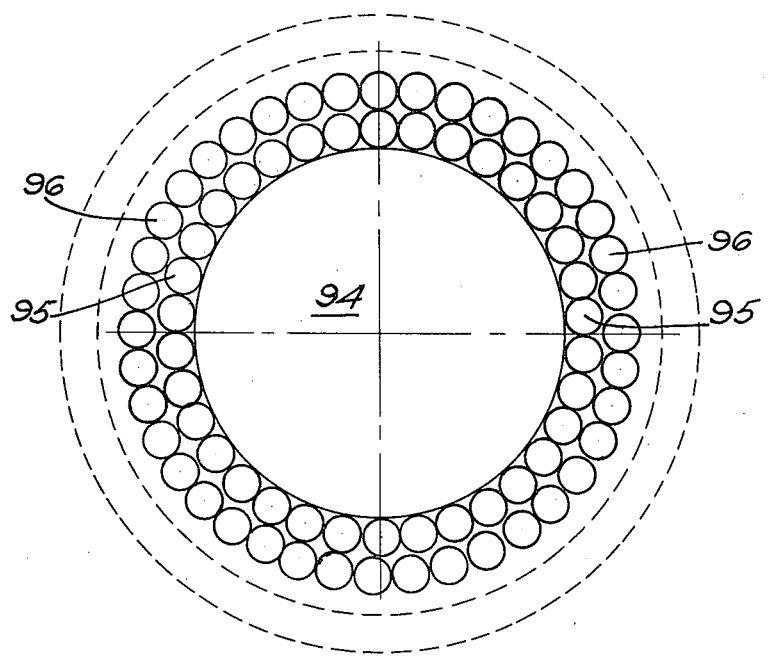
F I G. 18

WIDE BAND MOSAIC LENS ANTENNA ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to acoustic systems and more particularly to underwater sound transmitting or receiving systems having the unique property of providing a scannable directional substantially constant beamwidth diffraction pattern or beam over a wide band of frequencies.

A unique feature of the present invention as compared to other acoustic antenna arrays is the use of fully directive acoustic lens antennas each with an appropriate retina for scanning as the primary array antenna elements. This feature together with appropriate time delay devices eliminate the usual dependence of scanning delay requirements on wavelength or frequency and makes the scanning properties independent of frequency.

A second unique feature of the present invention is the use of a network of filters, switches, amplifiers and time delay elements with the array of acoustic lenses in such a way as to make the beamwidths of the beams formed by the array independent of frequency or constant in beamwidth over very large changes in frequency.

Many prior art devices in the underwater field have addressed themselves firstly to beam forming with array antennas and secondly to the problem of providing wide band frequency response so that maximum sound pressure level remains uniform over a wide range of frequencies. However, the only prior art devices known to have addressed themselves to the antenna design problem of maintaining a scannable substantially constant beamwidth directional diffraction pattern or beam over a wide range of frequencies are those described by Robert L. Sternberg in U.S. Patent Application Ser. No. 784,186, Frequency Independent Acoustic Antenna, and U.S. Pat. No. 4,068,082, Combination Acoustic Filter Plate and Liquid Lens. A primary limitation of these prior art devices is that their construction limits their range of practical application to problems requiring an antenna no more than a few feet or a few meters in diameter as otherwise the dense construction of the filter plate in the devices would make the system excessively heavy.

SUMMARY OF THE INVENTION

It is therefore a general object of the present invention to provide an improved acoustic receiving or transmitting mechanism. It is a further object that the acoustic receiving or transmitting mechanism produce a substantially constant beamwidth diffraction pattern over a wide range of frequencies suitable for fixed or scannable directional sound reception or transmission. Another object is that the receiving or transmitting mechanism be suitable for use with underwater sound. Other objects are that the mechanism be suitable for use in oil exploration, ultra-sonic medical diagnostics and various other acoustic enterprises. Further objects are that the device be compact, economical, rugged and durable. These and other objects of the invention and the various features and details of construction and operation will become apparent from the specification and drawings.

These several objectives are accomplished in accordance with the present invention by providing an array of fully directive acoustic lenses and a feed system or, equivalently, similar lenses and a receiving system.

In the transmitting mode a wide band electrical source transmits electrical signals to a plurality of discrete filters. The filters supplying transmitter signals to the center of the array pass all signals used with the device. The filters in between the array antenna center and periphery pass all signals except those at the highest frequency used with the device and the filters on the periphery pass only those signals which are at the lowest frequency used with the device. In this manner the lowest frequency transmitter signals are passed by all filters to the entire array antenna but the highest frequency signals are passed only by the filters serving the center of the array. When transmitting each filter supplies its output to a selective switch which selects a specific time delay according to the position of the lens in the array served by that filter and the angle scan of the beam being formed. In combination these time delays assist in providing a uniform plane wave front for the signal transmitted by the array operating as whole regardless of both the frequency and the angle of scan. Note that the required delays associated with each lens to bring the wave fronts radiated by each individual lens into a single plane wave front radiating from the entire array as a whole depend only on the individual lens diameters, or more precisely their center to center spacing, and on the angle of scan of the beam but not on the signal frequency or wavelengths being transmitted. The signals from the time delays are amplified and supplied to an array of acoustic retinas of transducers each of which converts the electrical signal applied to it into an acoustic signal which is transmitted as a diverging acoustic wave directed toward the acoustic lens corresponding to that retina. Each lens in the mosaic array of lenses then focuses the elementary beam of acoustic signals incident on it in the same direction as each other lens does thereby forming a plane wave composite beam in that direction composed of radiation from all the lenses. By successively energizing each one of the plurality of transducing elements in each retina of the array antenna, the direction of the beam can be scanned.

When used as a receiving device, the concept can be followed readily by reciprocity.

BRIEF DESCRIPTION OF THE DRAWINGS

FIG. 1 is a pictorial representation of a linear array of cylindrical lenses in accordance with the present invention;

FIG. 2 is a perspective view of the arrangement of a cylindrical lens and its associated retina in the linear array of FIG. 1;

FIG. 3 is an alternate embodiment of a linear array using circular lenses;

FIG. 4 is a perspective view of the arrangement of a circular lens and its associated retina, of the linear array of FIG. 3;

FIG. 5 is a view of a pair of squared off circular lenses;

FIG. 6 is a top view of the linear array of FIG. 1;

FIG. 7 is an enlarged top view of the arrangement of lens and retina of FIG. 1;

FIG. 8 is a pictorial-block diagram of a linear array system;

FIG. 9 is a horizontal beam pattern of a linear array at a number of frequencies;

FIG. 10 is a vertical beam pattern of a linear array at a number of frequencies;

FIG. 11 is a pictorial representation of a planar array of squared off circular lenses in accordance with the present invention;

FIG. 12 is an alternate embodiment of a planar array of hexagonal circular lenses;

FIG. 13 is a perspective view of the arrangement of a squared circular lens and its associated retina, of the planar array of FIG. 11;

FIG. 15 is a horizontal beam pattern of a planar array at a number of frequencies;

FIG. 16 is a vertical beam pattern of a planar array at a number of frequencies;

FIG. 17 is another alternate embodiment of a linear array of cylindrical lenses in which the central lens is made larger than the peripheral lenses; and FIG. 18 is another alternate embodiment of a planar array of circular lenses in which the central lens is made larger than the peripheral lenses.

DESCRIPTION OF THE PREFERRED EMBODIMENTS

Figure 14:
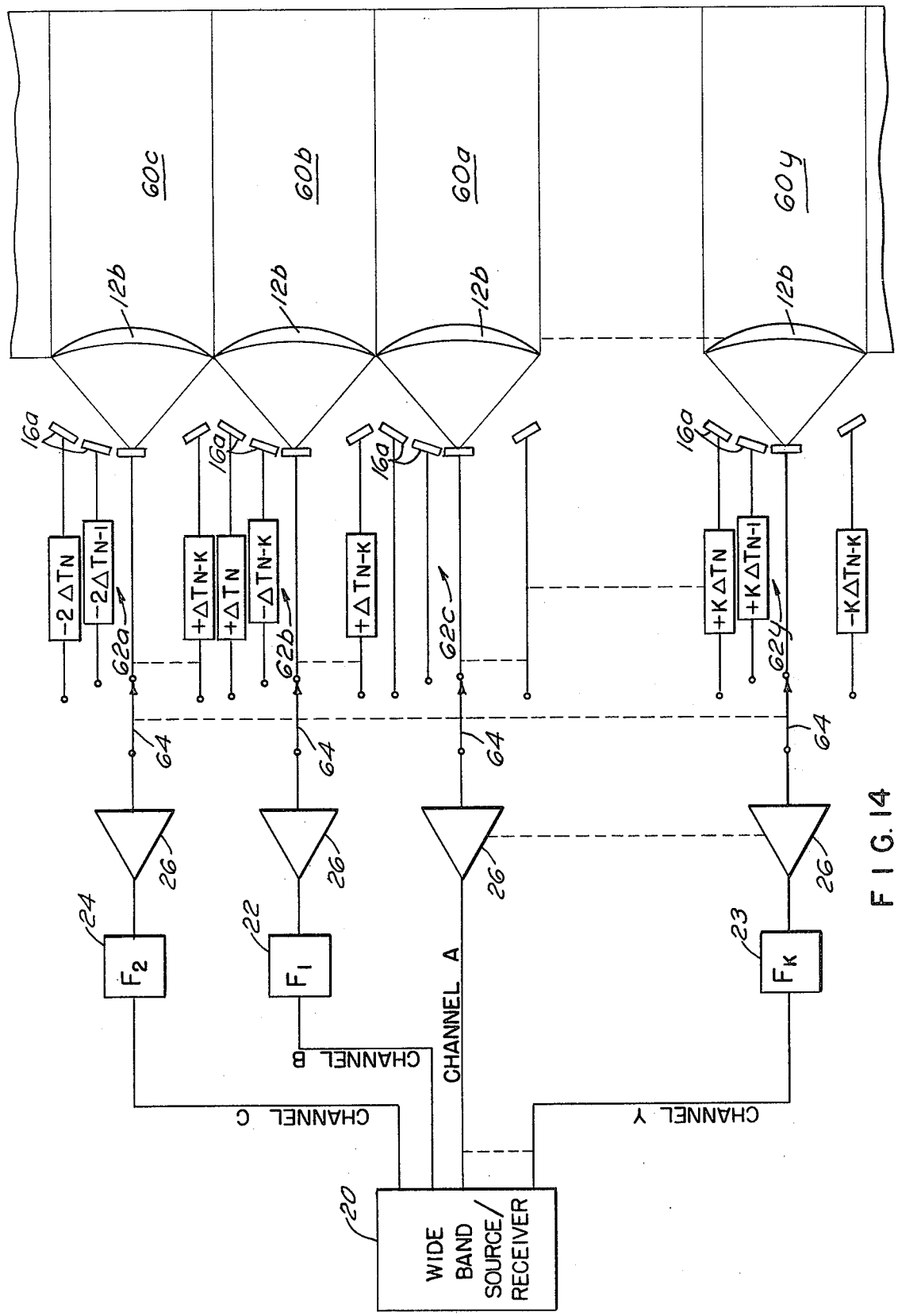
FIG. 14 is a pictorial-block diagram of a planar array system with the pictorial portion shown in cross-section.

The array antenna may be either linear, i.e., one-dimensional for the formation of fan beams or it may be two-dimensional for the formation of pencil beams.

Referring now to FIG. 1 there is shown firstly a linear array 10 of cylindrical lenses 12 mounted in a housing 14 for the formation of fan beams with constant beamwidth in the focused plane or plane of scan of the fan beam. FIG. 2 shows an enlarged perspective view of one of the lenses 12 without the housing 14. A retina 15 is comprised of a plurality of line source retina elements 16 that are located on the focal cylinder of the cylindrical lens. The number of lenses and retina elements shown in FIGS. 1 and 2, and in subsequent figures are for clarity. It is to be understood that in a typical system a larger number of lenses and retina elements could be used although theoretically the same or even a smaller number is possible.

FIG. 3 shows an alternate embodiment of FIG. 1 again suitable for the formation of fan beams. In this embodiment a linear array 10a of circular lenses 12a are mounted in a housing 14a. FIG. 4 shows an enlarged perspective view of one of the lenses 12a without the housing 14a. A plurality of point source retina elements 16a are shown located on the focal arc in the plane of scan back of the lens 12a. FIG. 5 shows an alternate embodiment of the lenses 12a of FIG. 3. In FIG. 5 there are circular lenses 12b that have been squared off so that the spaces or gaps between lenses can be eliminated. The lenses 12b are suitable for use with point source retinas similar to those shown in FIG. 4.

FIG. 6 is a top view of the elements shown in FIGS. 1 and 2 and carries similar notation. However, using minor modifications it is also applicable to FIGS. 3–5 inclusive. In FIG. 6 the array 10 is shown with lenses 12, housing 14 and retina elements 16. FIG. 7 is an enlarged top view of one of the lenses 12 and associated retina elements 16 in retina 15 of FIG. 6, without the housing 14.

Referring now to FIG. 8 there is shown a more complete diagram of the present invention including the network back of the antenna array. The following description pertains to the operation of the system as a transmitting device. The receiving device concept can be readily followed by reciprocity.

A wide band transmitting source 20 provides electrical signals to a plurality of channels notated as A, B, B', C and C'. Filters 22 and 24 receive signals from source 20. Channel A provides a filter free signal. Amplifiers 26 receive signals either directly from wide band source 20 or from respective filters 22 or 24. The amplifiers 26 are respectively connected to scanning selectors 28. The selectors connect the input signal to respective time delays of time delay networks 32b, 32b', 32c and 32c' or in the case of channel A there is no time delay network. Each channel then leads to a transducer retina element 16 for projecting a signal on respective lenses 12. Elementary beams 34a, 34b, 34b', 34c and 34c' are emitted from lenses 12 and form a composite beam. The lower case letter on the beams depict the associated channel. The time delay networks 32b, 32b', 32c and 32c' provide a common uniform wavefront for beams a–c'.

Channel A transmits all frequencies including the highest frequencies the lower limit of which is called here $f_o$. Filters 22 transmit all signals of a frequency that is less than $f_o$ and inhibit signals of a frequency $f_o$ and higher. Filters 24 transmit all signals of a frequency that is less than $f_2$ where $f_2$ is less than $f_1$ and inhibit signals of a frequency $f_2$ and higher. In other words, in channel A located at the center of the array, all frequencies from wide ban source 20 are passed since no filter appears in the channel. As one moves away from the center of the array antenna, the highest frequencies transmitted are progressively lower. It is seen that in the present invention that low frequencies are transmitted over the entire array, that high frequencies are transmitted only over the central party of the array and the higher the frequency the smaller the extent of the transmitting central portion. The inhibiting of the outer periphery beams at high frequencies is called shading.

Beamwidth for any aperture or broadside array antenna is a constant multiple of the ratio $\lambda/\Delta$, where $\Delta$ is the effective aperture diameter of the antenna. Referring to the linear array 10 of FIG. 1 $\Delta$ is the length of the central portion of the array of lenses 12 which transmits the sound of wavelength $\lambda$. It can be seen that by increasing the length of the energized part of the linear array 10 as the wavelength increases the ratio $\lambda/\Delta$ can be held substantially constant with the result that a constant beam-width in the horizontal plane or plane of scan of the linear array is obtained. In the present case for example beams with five lenses of equal diameters in the array with frequencies of 90 kHz, 30 kHz and 18 kHz can all be generated with a constant beamwidth in the horizontal plane or plane of scan. This occurs because the 18 kHz signal is passed through all five lenses 12, whereas the 30 kHz is passed only through the central three lenses 12 and the 90 kHz signal is only passed through the central lens 12. This is done by selecting filters 24 to inhibit frequencies of about 24 kHz and higher, and selecting filters 22 to inhibit frequencies of about 60 kHz and higher. Obviously, the more lenses 12 and filters that are used the greater the regulation of the beamwidth becomes.

FIG. 9 shows the respective sizes of the beamwidths of the 18 kHz, 30 kHz and 90 kHz in the horizontal plane or plane of scan of the linear array of FIG. 1 to be the same size independent of the frequency. FIG. 10 shows the beamwidth in the vertical plane where the widths are determined by $\lambda/\Delta'$ where $\Delta'$ is the vertical dimension of each lens in the linear array. In both planes the wavelength $\lambda$ changes but in the vertical plane the length $\Delta'$ remains constant whereas in the horizontal plane the length $\Delta$ also changes due to the operation of filters 22 and 24 of FIG. 8. This enables the beamwidth of the acoustic signal to remain substantially constant in the horizontal plane although it changes in proportion to the wavelength in the vertical plane.

Referring now to FIG. 11 there is shown secondly a planar or two-dimensional array antenna 50 as distinguished from the previously described linear array. The planar array 50 has squared off lenses 12b mounted in housing 52. FIG. 12 shows an alternate embodiment with a planar array 50a having hexagonal lenses 12c mounted in housing 52a. Both lenses 12b and 12c are circular lenses with the perimeters trimmed to eliminate gaps between lenses.

FIG. 13 shows an enlarged perspective view of one of the lenses 12b of a planar array antenna without the housing 52. A plurality of point source retina elements 16a are shown located on the focal surface in back of the lens 12b. It is to be noted that these elements 16a are arranged in a two-dimensional arrangement with respect to the lenses 12b differing from the linear arrangement previously described in the linear array antenna. The two-dimensional array antenna permits pencil beam formation and scanning in both the horizontal and vertical planes.

FIG. 14 shows a cross-sectional diagram of the planar or two-dimensional version of the present invention including both the lenses and the networks of filters, switches and retina elements. The following description pertains to the operation of the system as a receiver. The transmitting device concept can be readily followed by reciprocity.

Plane wave acoustic signals are incident on the lenses 12b via the elementary receiving beams 60a-y forming the composite beam of the planar array antenna. Since the acoustic signals arriving at the array antenna via the elementary beams 60a-y come from a direction parallel to the axes of the lenses 12b, they are focused on the central retina elements 16a of the point source retina elements 16a associated with each lens 12b of the planar array. The received acoustic signals are converted into electrical signals by the retina elements 16a. The electrical signals are then fed to time delay networks 62a-y. The signals are not time delayed in the case illustrated since the original plane wave acoustic signal arrives from a direction parallel to the axes of the lens 12b and strikes all of them simultaneously. However, if the original plane wave acoustic signal was arriving from a different angle as in FIG. 8, then different retina elements off the axes of the lenses 12b and different time delays of networks 62a-y would be used depending on the angle of incidence to lenses 12b. The electric signals then pass through switches 64 for scanning. The signals are then passed through amplifiers 26, filters 22, 23 and 24 to wide band source/receiver 20.

The filters 22, 23 and 24 are chosen so that filter 22 conducts all signals of frequency f less than $f_1$, filter 24 conducts all signals of a frequency f less than $f_2$ where $f_2$ is less than $f_1$, and $f_k$ conducts all signals of frequency f less than $f_k$ where $f_k$ is dependent on the distance of the channel Y lens 12b from the center of the planar array. In other words, in channel A located at the center of the array all frequencies are passed since no filter appears there. As one moves away from the center, the highest frequencies conducted are progressively lower. This means that the lens 12b associated with channel C is further from the center of the array than the lens 12b associated with channel B since channel C will not pass frequencies as high as channel B. Whether channel Y passes frequencies as high as channel B or C depends on the position of its lens 12b from the center of the array.

It is seen that in the present invention low frequencies are received over the entire array, high frequencies are effectively received only over the central part of the array and the higher the frequency the smaller the diameter of the effective receiving central area. Since beamwidth is a constant multiple of the ratio $\lambda/\Delta$ where $\Delta$ is the diameter of the central area of the planar array of lenses 12b which effectively receives the sound of wavelength $\lambda$, it can be seen that the square root of the surface area of the array over which the sound is effectively received is in direct proportion to the wavelength of the applied signal. Since frequency is inversely proportional to wavelength the filters must be chosen so that if a first lens is twice the distance from the center of an array than a second lens, the filter associated with the first lens will effectively pass frequencies up to half as high as the filter associated with the second lens. If a third lens is thrice the distance from the center of an array than the second lens the filter associated with the third lens will effectively pass frequencies up to a third as high as the filter associated with the second lens, etc. Obviously, it is desirable to use a large number of lenses in an array to permit a more constant beamwidth to be transmitted or received over a wide range of frequencies.

FIG. 15 shows the respective sizes of the beamwidths of the 18 kHz, 30 kHz and 90 kHz to be the same size in the horizontal plane. FIG. 16 shows a similar pattern in the vertical plane. If one were to take a cross-section of the beamwidths at an angle other than the horizontal or vertical planes slight variations would develop that could be minimized by a large number of small lenses 12b. One could think of this as a step function approximating a ramp function as the number of steps increases and the height of the step decreases.

FIG. 17 shows a linear array in which the central lens 90 is ten times as wide as each of the peripheral lenses 91 and 92 located on each side. The dashes show that more lenses can be added. A corollary embodiment of a planar array is shown in FIG. 18 with central circular lens 94 having ten times the diameter of peripheral circular lenses 95 and 96. The dashed circles show additional rings of circular lenses can be added.

In FIG. 17 the same size horizontal beamwidths are achieved for $f_o$, $(10/12)f_o$ and $(10/14)f_o$ by activating only central lens 90 for $f_o$, central lens 90 and peripheral lenses 91 for $(10/12)f_o$, and lenses 90, 91 and 92 for $(10/14)f_o$. In FIG. 18 the same reasoning can be applied to lenses 94, 95 and 96 to show how the same size horizontal and vertical beamwidths are achieved and it is obvious from these arrangements that theoretically an infinite range of frequencies can be used. It is only the practical construction of the device that would limit the lens capability. For instance, five peripheral lenses on each side of the central lens 90 in FIG. 17 would enable a frequency range of substantially constant beamwidth of one octave from $f_o$ to $\frac{1}{2}f_o$ to be achieved. Forty-five peripheral lenses on each side of the central lens 90 would enable a frequency range of substantially constant beamwidth of one decade to be achieved, etc. The same reasoning can be used to show that the planar array of FIG. 18 also can be made to achieve an arbitrarily large frequency range of constant beamwidth pencil beam operation by adding a sufficiently large number of peripheral lenses to the array. For instance, five rings of peripheral lenses to central lens 94 would enable a frequency range of substantially constant beamwidth of one octave from $f_o$ to $\frac{1}{2}f_o$ to be achieved; forty-five rings of peripheral lenses added to central lens 94 would enable a frequency range of substantially constant beamwidth of one decade to be achieved, etc.

There has therefore been described a linear array mosaic lens antenna system in which a transmitted or received acoustic signal has a substantially constant beamwidth in the horizontal plane that is independent of frequency, but varies in beamwidth in the vertical plane in accordance with the relationship wavelength/diameter of an aperture antenna. There is also described a mosaic lens antenna system in which a transmitted or received beam has a substantially constant beamwidth in all planes passing through the axes of symmetry of the beam.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. An acoustic transmitter comprising:
   wide band electrical means for inhibiting electrical signals of predetermined frequencies and conducting electrical signals of other predetermined frequencies, said wide band electrical means includes a plurality of electrical filters that all pass low frequency signals, some of said electrical filters differ from others in that they have different predetermined high frequency cutoff points;
   wide band transducer means for accepting the conducted electrical signals and converting the conducted electrical signals into acoustic signals, said wide band transducer means has transducer subarrays arranged in an array and connected to respective members of said plurality of electrical filters so that the more toward the center of said array each of said transducer subarrays is located the higher the high frequency cutoff point of the electrical filter to which it is connected; and
   acoustic means for focusing the acoustic signals and simultaneously forming a plurality of individual near field elementary acoustic beams that form a substantially constant beamwidth frequency independent composite far field acoustic transmitting beam, said acoustic means comprises an array of fully directive indicidual acoustic lens antennas.

2. An acoustic transmitter according to claim 1 further comprising scanning means for frequency independent scanning of said substantially constant beamwidth frequency independent composite far field acoustic transmitting beam.

3. An acoustic transmitter according to claim 2 wherein said array is a linear array.

4. An acoustic transmitter according to claim 2 wherein said array is a planar array.

5. An acoustic transmitter according to claim 4 wherein said wide band transducer means has said transducer subarrays arranged in such a pattern and connected to said wide band electrical means in such a manner that as the wavelength of the electrical and hence acoustic signal varies, the diameter of said wide band transducer means that is operational varies so that the ratio of wavelength of said acoustical signals to the diameter of said wide band transducer means that is operational remains constant.

6. An acoustic receiver comprising:
   acoustic means for receiving acoustic signals and simultaneously focusing a plurality of individual near field elementary acoustic beams that form a substantially constant beamwidth frequency independent composite far field acoustic receiving beam, said acoustic means comprises an array of fully directive indicidual acoustic lens antennas;
   wide band transducer means having transducer subarrays arranged in an array for accepting said plurality of individually focused near field elementary acoustic beams from said acoustic means and converting the acoustic signals in said elementary beams into electrical signals; and
   wide band electrical means for conducting electrical signals of predetermined frequencies and inhibiting electrical signals of other predetermined frequencies that together form the electrical analogue of the said substantially constant beamwidth frequency independent composite far field acoustic receiving beam, said wide band electrical means includes a plurality of electrical filters that all pass low frequency signals, some of said electrical filters differ from others in that they have different predetermined high frequency cutoff points, said electrical filters connected to respective members of said transducer subarrays so that the more toward the center of said array each of said transducer subarrays is located the higher the frequency cutoff point of said electrical filter which is connected.

7. An acoustic receiver according to claim 6 further comprising scanning means for frequency independent scanning of said substantially constant beamwidth frequency independent composite far field acoustic receiving beam.

8. An acoustic receiver according to claim 7 wherein said array is a linear array.

9. An acoustic receiver according to claim 7 wherein said array is a planar array.

* * * * *